No. 845,695. PATENTED FEB. 26, 1907.
N. B. CONVERSE.
PITTED PRUNE AND METHOD OF PITTING IT.
APPLICATION FILED NOV. 30, 1906.
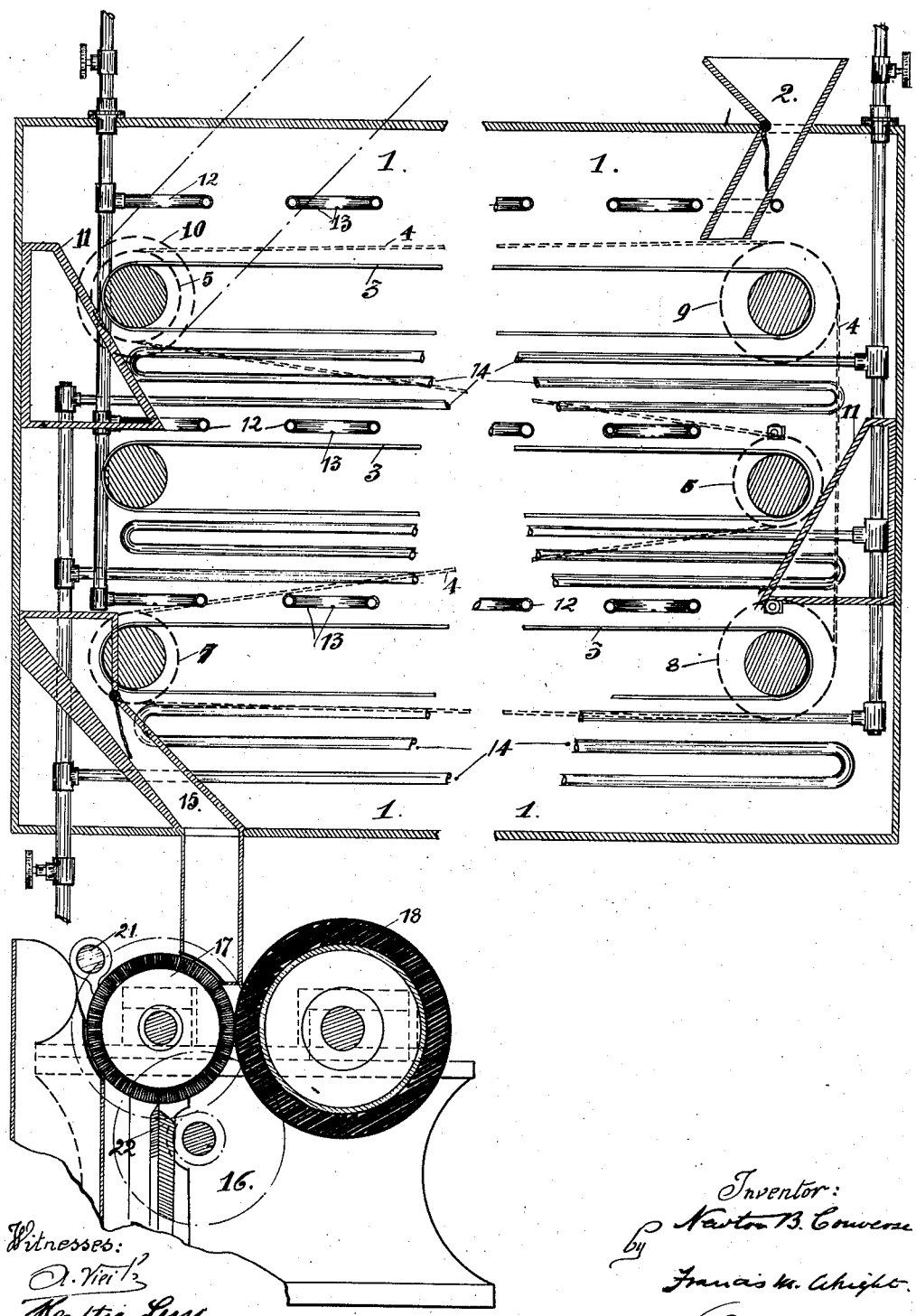

UNITED STATES PATENT OFFICE.

NEWTON B. CONVERSE, OF FRESNO, CALIFORNIA, ASSIGNOR TO HIMSELF AND FRANCIS M. WRIGHT, TRUSTEES, OF SAN FRANCISCO, CALIFORNIA.

PITTED PRUNE AND METHOD OF PITTING IT.

No. 845,695.    Specification of Letters Patent.    Patented Feb. 26, 1907.

Application filed November 30, 1906. Serial No. 345,635.

*To all whom it may concern:*

Be it known that I, NEWTON B. CONVERSE, a citizen of the United States, residing at Fresno, in the county of Fresno and State of California, have invented new and useful Improvements in Pitted Prunes and Methods of Pitting Them, of which the following is a specification.

The object of the present invention is to provide as a novel article of manufacture prunes so prepared as to be more conveniently and more economically cooked and in a more desirable form as food than heretofore and also possessing other advantages in economy and convenience hereinafter set forth.

A further object is to provide a process of treating the prunes for the above purpose.

So far as I am aware prunes have never to any considerable extent been put on the market except in their natural condition, unpitted and uncooked. The cause of this appears to arise from the character of the prune, which is dried from a cling-stone plum, the pulp of the prune adhering to its pit with great tenacity, thus rendering the prune very difficult to pit by machinery or in large quantities. I have, however, discovered a process by which the pits can be readily extracted and the prunes prepared in a more convenient and desirable form for transportation and for retail sale.

In the accompanying drawing the figure is a broken longitudinal sectional view of an apparatus suitable for carrying out my improved process.

Referring to the drawing, 1 indicates a cooking-chamber into which the prunes are fed from a hopper 2, falling upon the uppermost of a vertical series of horizontal traveling drapers 3, said drapers traveling in opposite directions alternately, being driven by a sprocket-chain 4 around sprocket-wheels 5 6 7 and around idle wheels 8 9, the shaft of the sprocket-wheel 5 being driven from a pulley 10. The prunes fall upon the drapers in turn by means of chutes 11 and are by said drapers carried alternately to opposite ends of the cooking-chamber. Immediately above each draper is a coil of pipe 12 containing live steam, which is discharged downward through perforations 13 in the lower side of the pipe onto the prunes on said draper, and between the drapers are also closed steam-pipes 14.

The specific construction of the apparatus above described forms no part of the present invention.

The prunes are retained in the cooking-chamber for a sufficient length of time, depending upon the temperature of the steam, to "semicook" the prunes. By the word "semicook" here and in the claims, as distinguished from "partly cooked," is meant that the prunes are cooked sufficiently to destroy the inherent tendency of the pulp to cling to the pit. A partial cooking which did not effect this result would not be sufficient for carrying out this process. When semicooked in the above manner by steam and heat, this property of adhesion is destroyed before the prunes are fully cooked—that is, cooked to the consistency and tenderness generally desired for table use. The prefix "semi" is therefore not used in the exact sense of half-cooked, but merely that the pulp shall be sufficiently cooked to readily part from the pit without being fully cooked. From the cooking-chamber the prunes are discharged into a chute 15, leading to a prune-pitting machine 16, which resembles a raisin-seeding machine in general construction—that is to say, it comprises an impaling-cylinder 17, upon which the body of the prune is impaled by means of a pressure-cylinder 18, having a rubber surface, the pit of the prune being extruded by the ends of the teeth of the impaling-cylinder. A pit-remover 21 removes from the ends of the teeth such pits as have not already fallen by gravity, and shedders 22 afterward shed the prunes from the teeth.

In practicing the above process it is important that the prunes be subjected for a considerable length of time—say from fifteen to thirty minutes—to the action of steam and heat and that the temperature in the chamber be maintained at certainly not much less than boiling-point, and preferably at a higher temperature, as 280°. In this respect the process differs from that of preparing raisins for the raisin-seeding machine, as in the case of raisins it is important that the temperature should not approach boiling-point, a temperature of 140° being that usually employed. A much higher temperature than the latter has the effect of rendering the raisins mushy and unfit for use. The raisins must not be cooked. This difference in the processes required for treating prunes and raisin is no doubt due to the fact that in the raisins there is no inherent tendency of the pulp to cling to the seed, as is the case with prunes, but the pulp is merely congealed or set about the seed in the operation of drying the raisin to get rid of the cap-stem. In the case of the raisin the heat is merely imparted to soften the pulp, and the change effected is physical rather than chemical. In the case of prunes, however, a true chemical change is effected, and the prune is actually cooked, although the cooking may not be complete.

The character of the internal surface of the prune after the pit has been removed, as well as the degree of tenderness of the skin and pulp, indicates whether the prune has thus been semicooked. If the surface of the cavity left by the pit is substantially smooth and unbroken, the only exceptions being around the holes made by the impaling-teeth and the extruded pit and possibly at the part of said surface formerly attached to the pointed or narrow end of the pit, the prune has been semicooked. If not semicooked, said surface will be found to be generally broken and lacerated, caused by its general adhesion to the surface of the pit as the latter is extruded. The prune thus treated by the combined action of live steam and heat contains comparatively little moisture and may be considered as "dry" as compared with a prune stewed or partly stewed in water. Consequently it will keep just as long as an unpitted prune and will not ferment. Moreover, the saccharine and other constituents which would be dissolved or infused by the direct action of boiling water are retained in the prune. In other words, the prune remains "integral" as regards the edible portion thereof, the only part discarded being the pit. In this respect also it differs from stewed prunes.

The product thus prepared is a valuable article of manufacture for the following reasons: First, it dispenses with the necessity of removing the pits from the cooked prunes when eating them; second, it saves labor in preparing puddings, soufflés, and other dishes of which prunes form an ingredient, and it serves to extend the use of prunes in cooking, since the semicooked pitted prunes may be minced or chopped fine and used as are raisins in making mince-meat and the like; third, it saves time in cooking; fourth, it saves fuel in cooking; the preliminary cooking in the factory costing comparatively little; fifth, the prunes can be readily compressed, which the unprepared prunes cannot, and hence the prepared prunes are in convenient form for retail sale in cartons, or they can be strongly compressed in square blocks; sixth, the weight of the product is less and the cost of transportation correspondingly reduced; seventh, the pits heretofore wasted can now be utilized as a by-product; eighth, the prunes thus prepared keep equally as well as the ordinary uncooked and unpitted prunes.

I claim—

1. As an article of manufacture, a dry, semicooked, pitted prune, substantially as described.

2. As an article of manufacture a dry, semicooked, edibly integral, pitted prune, substantially as described.

3. As an article of manufacture, a dry, cooked, pitted prune, the surface of the pit-cavity being substantially smooth or unbroken, substantially as described.

4. As an article of manufacture, a dry, cooked, edibly integral pitted prune, the surface of the pit-cavity being substantially smooth or unbroken, substantially as described.

5. The process of treating prunes which consists in semicooking the prune to render the pulp freely separable from the pit, and then, while the pulp immediately around the pit is still hot, passing the prune between impaling and pressure devices to extrude the pit from the prune, substantially as described.

6. The process of treating prunes which consists in semicooking the prune by dry heat and steam alone to render the pulp freely separable from the pit, and then, while the pulp immediately around the pit is still hot, passing the prune between impaling and pressure devices to extrude the pit from the prune, substantially as described.

7. The process of treating prunes which consists in cooking the prune sufficiently to render the pulp freely separable from the pit, and then, while the pulp immediately around the pit is still hot, passing the prune between impaling and pressure devices to extrude the pit therefrom, substantially as described.

8. The process of treating prunes which consists in cooking the prune by dry heat and steam alone sufficiently to render the pulp freely separable from the pit, and then, while the pulp immediately around the pit is still hot, passing the prune between impaling and pressure devices to extrude the pit therefrom, substantially as described.

In testimony whereof I have hereunto set my hand in the presence of two subscribing witnesses.

NEWTON B. CONVERSE.

Witnesses:
 D. B. RICHARDS,
 FRANCIS M. WRIGHT.